Nov. 3, 1970    J. BORNSTEIN    3,537,311
MEASUREMENT OF HEAT EXCHANGE
Filed Sept. 28, 1967    3 Sheets-Sheet 1

INVENTOR
JOSEF BORNSTEIN
BY Hane and Bayley
ATTORNEYS

United States Patent Office 3,537,311
Patented Nov. 3, 1970

3,537,311
MEASUREMENT OF HEAT EXCHANGE
Josef Bornstein, Farsta, Sweden, assignor to Telefonaktiebolaget L M Ericsson, Stockholm, Sweden, a corporation of Sweden
Filed Sept. 28, 1967, Ser. No. 671,300
Int. Cl. G01k 17/06
U.S. Cl. 73—193                                8 Claims

ABSTRACT OF THE DISCLOSURE

A device for measuring the quantity of heat consumed by a medium circulating through a heat exchange system senses the temperature differential between the medium in an input conduit and an output conduit of the heat exchange system. The sensed differential is fed to a comparing means such as a bridge and the resulting unbalance of the bridge is measured by a measuring instrument. After a predetermined volume of the medium flow a counter and a control device such as a potentiometer for returning the bridge to balance are activated. Return of the bridge to balance also returns the measuring instrument to its zero position. Return of the instrument to zero initiates switching operations stopping the potentiometer and the counter. The period of time between starting and stopping the potentiometer and the counter is representative of the quantity of heat which has been consumed.

---

The present invention relates to the measurement of the total quantity of heat exchanged by the medium in a loop of a circulating medium heat exchange system. The main application of the invention is to measure the consumption of heat for relatively large users, for example in dwelling houses, large premises, and the like. These cases have in common that the heat is given off relatively continuously.

There has been proposed a meter wherein a deflection due to a restricted passage in a volume meter or a speed of rotation due to a water meter is brought to a so-called multiplication mechanism, which is simultaneously actuated by means of a temperature meter either sensitive to the temperature of the medium or, in a circulatory heat system, to the temperature difference between the inflow and return lines. The resulting product of multiplication is registered as units of heat in an integration mechanism, for example a counter. The recorder of such a meter effects registration by rotating with a speed proportions to the consumption of heat. A disadvantage of such a meter is the very sensitive and complicated multiplication mechanism that is required, since this must operate throughout a range that is the product of the ranges of measurement of the two quantities being multiplied.

According to the present invention there is provided a heat meter for use with a circulating medium heat exchange system for providing a measure of the total quantity of heat exchanged by the medium in a loop of the systems, the heat meter comprising a temperature meter portion suitable to provide an indication corresponding to the temperature difference between the inflow and return lines of the loop, measured at the same time, compensating means which when actuated compensate for said indication, a quantity meter portion suitable to actuate the compensating means each time a fixed quantity of the medium has passed through the loop, and totalling means arranged to be operated coordinately with compensation by the compensating means and to produce a total corresponding to an accumulation of the individual said indications.

The invention will be more particularly described with reference to the accompanying drawings, wherein.

Figure 1:
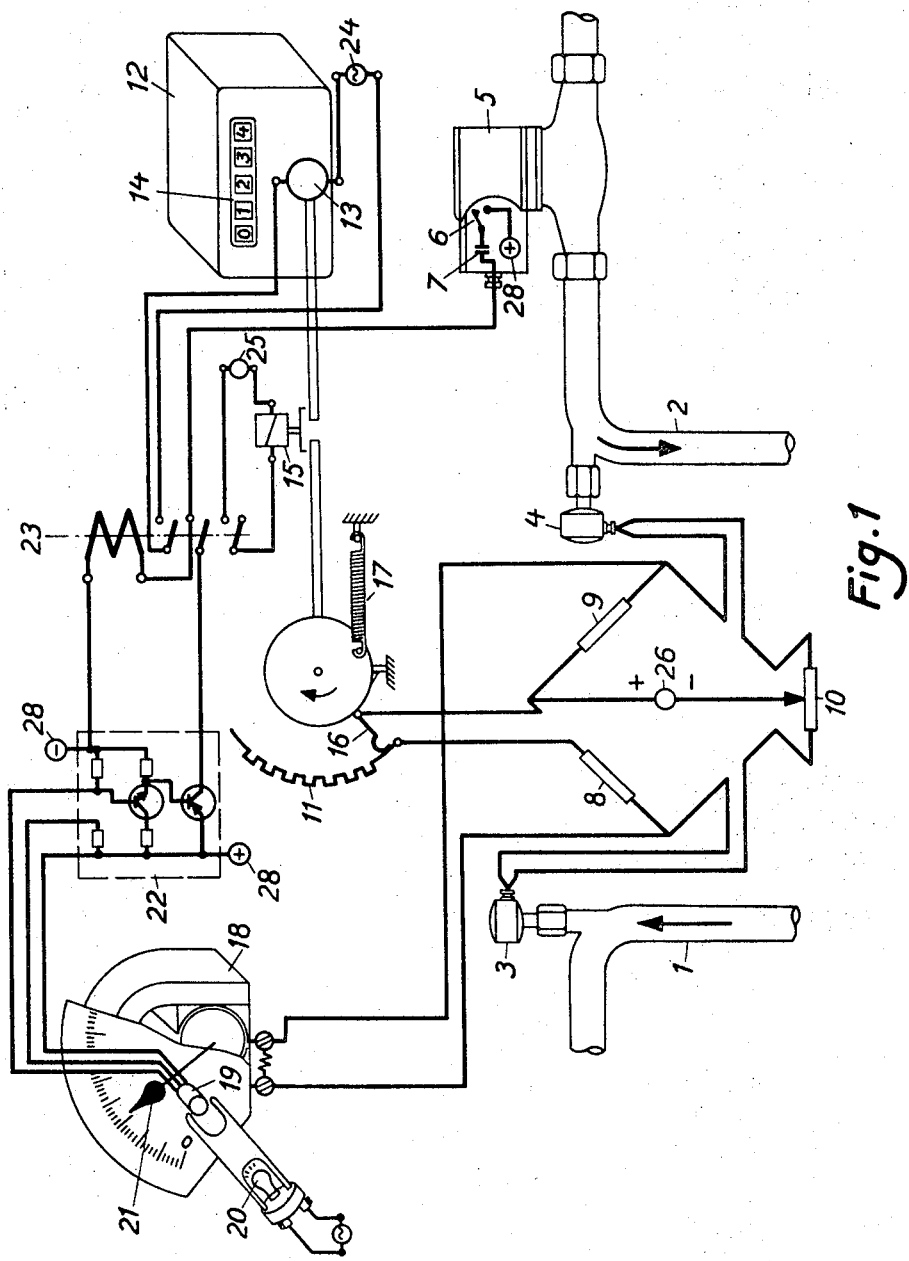
FIG. 1 is a diagram which shows one embodiment of the invention.

In the embodiment illustrated in FIG. 1, use is made of hot water flowing in a utilization loop (not shown) having an inflow line 1 and a return line 2. It is the consumption of heat in this loop (which may consist of an arbitrary number of paths connected in series or in shunt), which is to be measured by a heat meter in accordance with the invention. Temperature sensitive bodies 3 and 4 are connected in the lines 1 and 2 respectively.

The heat meter comprises a known water meter 5, provided with an arrangement of a capacitance 7 and a contact 6 for the transmission of an electric impulse each time a certain volume of water has passed the meter. The capacitance is charged from a current source 28.

The temperature sensitive bodies 3 and 4 are of resistance type and are arranged in a balanceable bridge comprising resistors 8, 9 and 10, fed from a separate current source 26. In the upper left-hand arm of the bridge there is connected a variable potentiometer 11. A register 12 comprises an electric motor 13 arranged to rotate with constant speed, for example a synchronous motor, connected to a source of current throughout certain time periods. By means of cog wheel transmissions the register 12 drives a totalling counter 14 for the indication of running time, as well as the slides 16 of the potentiometer 11 by way of a normally disengaged electromagnetic clutch 15. During the time while the register is at rest, the potentiometer is held in a short circuited position by a spring 17.

Owing to the temperature difference between the inflow and return lines, 1 and 2, an unbalance arises in the bridge, and is indicated on a galvanometer 18 connected in the bridge circuit. The galvanometer 18 is provided with an arrangement for indicating its zero position, that is the position at which the temperature measuring bridge is in balance. In the present example the indicating arrangement comprises a photoelectric cell resistance 19 and a source of light 20 placed opposite it. The ray of light is interrupted by the pointer 21 of the galvanometer when the pointer is in the zero position. The photo-electric cell 19 is connected to a relay 23 by way of a known transistor circuit 22, the contacts of the relay when the same is energized connecting the synchronous motor 13 to the line voltage source 24 and the electromagnetic clutch 15 to a current source 25.

When a certain volume of water has passed, the water meter emits an impulse which actuates the relay 23, the latter remaining in an operated position due to a hold current provided by the transistor circuit from a current source 28 as long as the galvanometer 18 provides an indication, whereby the photo-electric cell resistance 19 is illuminated and thus has a low resistance. The relay 23 at the same time starts the synchronous motor 13 and operates the electromagnetic clutch 15 to effect a connection between the potentiometer 11 and the shaft of the synchronous motor 13. The arm 16 of the potentiometer starts to move with a constant speed and continues to do so until the bridge is in balance and the pointer of the galvanometer has returned to its zero position. At that moment the ray of light is interrupted by the galvanometer pointer 21, the current through the photo-electric cell resistance 19 decreases, the hold current from the transistor circuit ceases and the relay 23 releases. The potentiometer is brought back into a short circuited position by the spring 17 and the system is ready for another impulse from the contact 6 of the water meter.

The length of the time period during which the register 12 is running is thus dependent upon the time required for returning the bridge to balance by means of the potentiometer 11. As this time is dependent upon the extent of the unbalance, that is the difference between the resistance values of the temperature sensitive bodies 3 and 4, the running time of the register 12 will be a measure of the temperature difference between the inflow and return lines 1 and 2. By choosing a suitable transmission ratio between the number of revolutions of the motor 13 and the number of revolutions of the shaft driving the potentiometer 16, it is possible to select a suitable value of time to be registered in the counting mechanism as a measure of the quantity of heat given off by the water in the loop between the lines 1 and 2. A certain time displacement between registration and consumption arises with this system. This is of no importance however with regard to large users, for example dwelling houses or industrial users, and furthermore any small discrepancies that may occur will cancel each other out in time.

Figure 2:
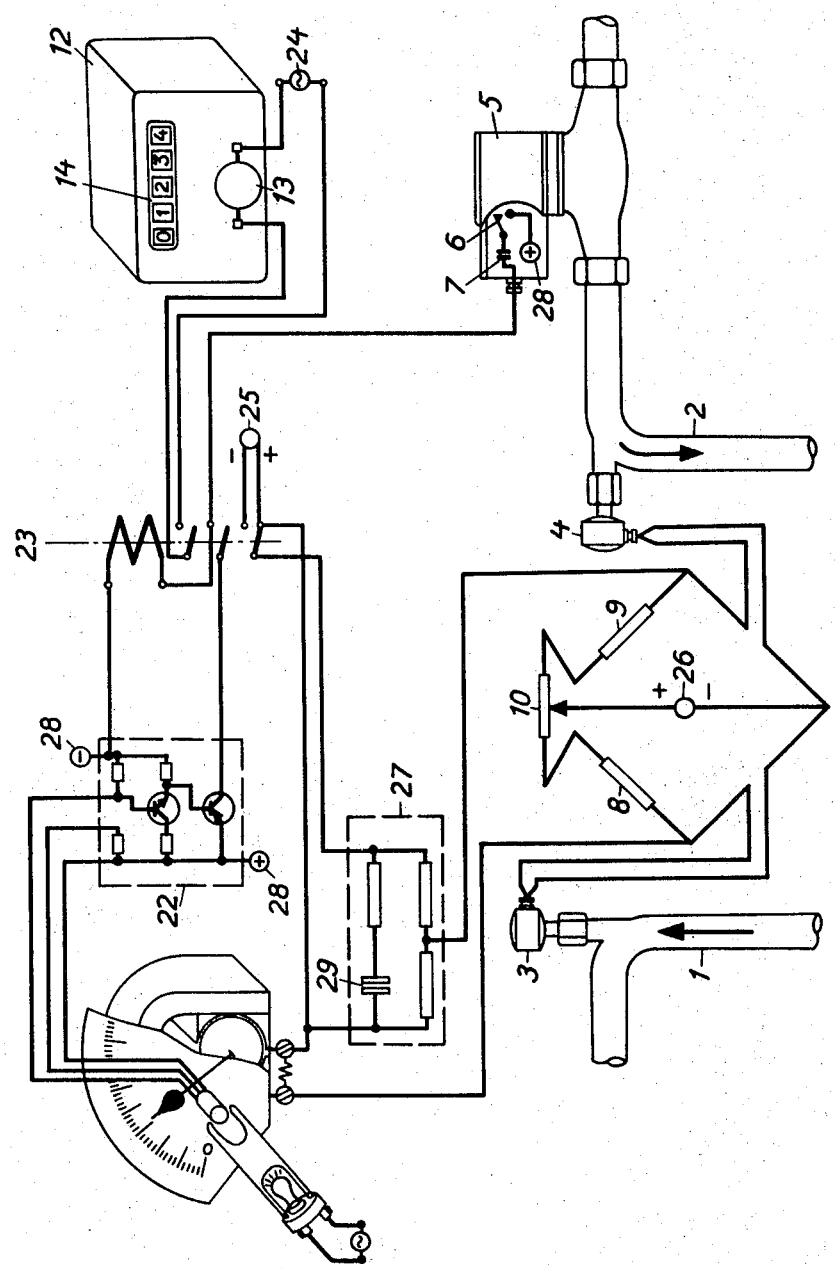
FIG. 2 is a diagram which shows another embodiment of the invention.

Referring to FIG. 2, the water volume meter 5 is of the same kind as in the embodiment shown in FIG. 1, and the temperature sensitive bodies 3 and 4 are likewise connected in a similar way in a bridge comprising resistances 8, 9 and 10. In parallel with the bridging arm containing the galvanometer there is connected an RC-circuit 27, comprising a capacitance 29, which is fed from the separate direct current source 25. The register 12, in this embodiment likewise, comprises the synchronous motor 13 with the counting mechanism 14. The arrangement comprising the galvanometer 18 together with the photoelectric cell 19 and the relay 23 is similar to that in the embodiment illustrated in FIG. 1.

An impulse from the volume meter 5 actuates the relay 23, which is held in its operated position by current from the source 28 as long as the pointer of the galvanometer is deflected, that is as long as the pointer is out of its zero position.

The relay 23 then starts the synchronous motor 13 and connects the RC-circuit 27 to the source of current 25 so that the capacitance 29 of the RC-circuit starts to charge. This gives rise to an oppositely directed current in the circuit of the galvanometer, the pointer of which is, during the charging, slowly brought back to its zero position. When the pointer has reached the zero position the relay releases and the meter is again ready to receive a new impulse from the water volume meter. The remaining time of the synchronous motor 13, starting when the relay 23 is connected, is indicative of the time required for returning the pointer to the zero position. This time is a function of the unbalance of the bridge, that is a function of the temperature difference between the temperature sensitive bodies 3 and 4. The sum of the time registered for each impulse from the volume meter, may be read on the counting mechanism 14. This sum is a function of the quantity of heat used.

Figure 3:
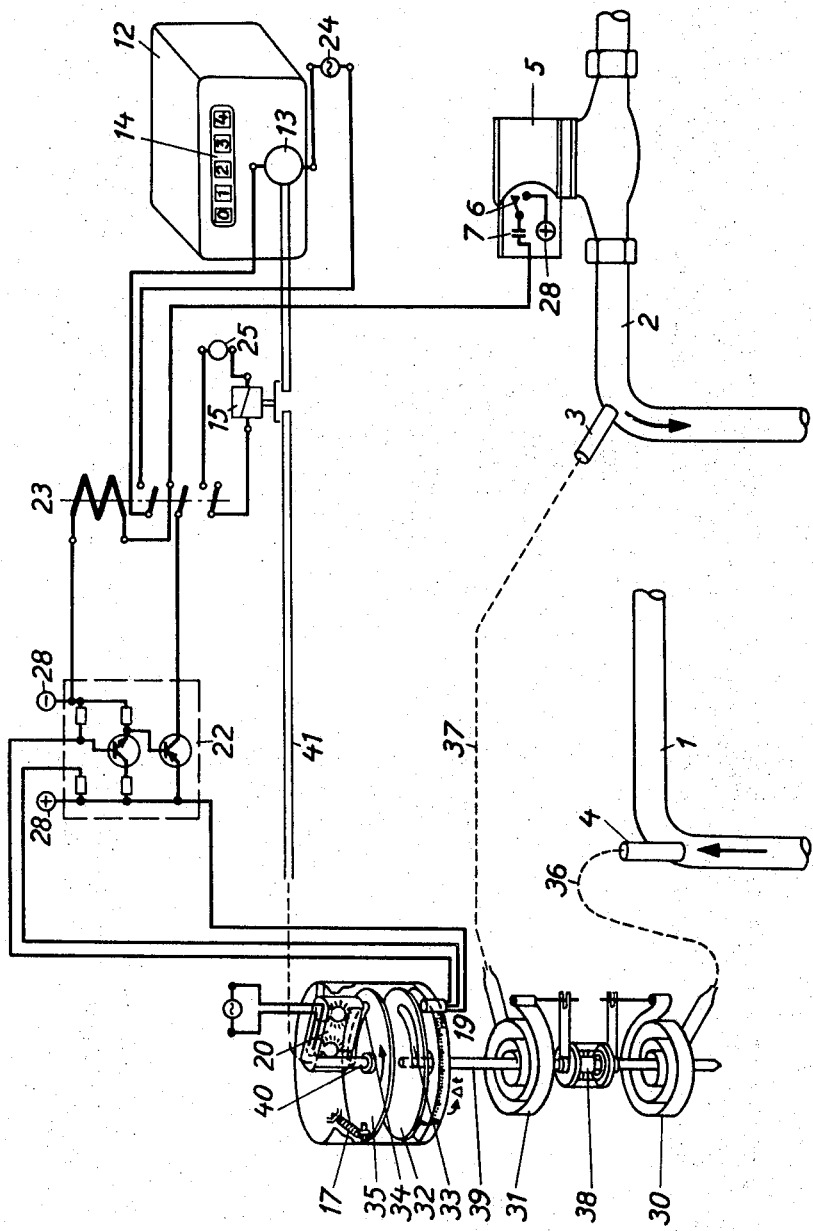
FIG. 3 is a diagram which shows yet another embodiment of the invention.

In the embodiment illustrated in FIG. 3, the temperature sensitive devices 3 and 4 comprise bodies filled with liquid and having a connection, through capillary tubes indicated by lines of short dashes, 36 and 37, to a Bourdon-tube 30 and 31 respectively. A temperature variation in either of these temperature sensitive bodies causes a corresponding pressure variation in the respective Bourdon-tube with an accompanying angular deflection of its shaft. If the shafts of the Bourdon-tubes are returned to the initial angular position in a suitable way by means of a differential device 38, the differential angular deflection of a shaft 39 is a measure of the temperature difference, being in the present case indicated by a rotation of a plate 32, proportional to the temperature difference. In this plate, operating as a shutter, there is a window in the form of a curved slit 33, the angular arc of which is the same as the angular deflection for the expected maximal temperature difference. There is a slit 34 of the same length in a plate 35 also operating as a shutter, which is coaxial with the plate 32 and fastened on a shaft 40, which is arranged to be driven by the synchronous motor 13 by means of the electromagnetic clutch 15 via s shaft 41. The connection between the shafts 40 and 41 of the plate 35 and of the synchronous motor respectively is indicated by a line of short dashes. Above the slit 34 there is placed an elongate source of light 20a, producing an evenly dispersed luminous flux over the length of the slit. The plates 32 and 35 are in reality very close to one another; in the figure they are shown spaced apart to facilitate understanding of the figure. Below the plate 32, the photoelectric cell resistance 19 is placed so that it is situated just outside the end of slit 33, so that the light through slit 34 is obturated when the temperature difference deflection is 0, as it is in the position shown in the figure.

In the case of a temperature difference occurring between the water conduit lines 1 and 2, the plate 32 is turned in counter clockwise direction and the photoelectric cell resistance 19 is exposed to rays of light from the source of light 20. This means that an impulse from the volume meter 5 will start the synchronous motor 13 with the counting mechanism 14 and close the electromagnetic clutch 15 in the manner described in connection with FIGS. 1 and 2. The plate 35 is now turned with a constant speed in counter clockwise direction, indicated by the arrow, until the angle through which it corresponds to the angle turned through which the plate 32 has turned or, in other words, corresponds to the indication which is the temperature difference deflection. The ray of light is now interrupted and consequently also the relay circuit (and the current supply to the synchronous motor 13), whereby the plate 35 is returned by the spring 17 to its original position, awaiting the next impulse from the meter 5. The totalling counting mechanism 14 is driven by the synchronous motor 13, so that during the above-described process it has been actuated for a time proportional to the temperature difference.

In plants where a constant or periodically variable flow is assumed the volume meter can be replaced by an arrangement for impulse sending, the frequency of which is in proportion to the volume flow.

I claim:
1. A measuring device for measuring the quantity of heat consumed by a medium circulating through a utilization loop of a heat exchange system having inlet and outlet conduits, said measuring device comprising in combination:

temperature sensing means arranged to be connected to an inlet conduit and an outlet conduit for sensing the temperature of the medium in each conduit;

comparing means connected to said temperature sensing means to generate a first quantity whose magnitude is indicative of the temperature differential of the medium in each conduit;

first measuring means, connected to said comparing means, including a member responsive to said first quantity and variable between a position representative of a zero temperature differential of the medium in each conduit and a position representative of the actual temperature differential of the medium in each conduit as represented by the magnitude of said first quantity, said first measuring means further including means for emitting a first signal when said member is in said position representative of said zero temperature differential;

second measuring means for measuring the volume of medium circulating in at least one of said conduits and emitting a second signal for each given quantum of volume circulated;

a two-state control means connected to said first measuring means and to said second measuring means, said two-state control means being switched to a first state upon receipt of a first signal from said first measuring means and being switched to a second state upon receipt of a second signal from said signal measuring means;

nulling means connected to said two-state control means and to said comparing means for alternately decreasing at a given rate the magnitude of the said first quantity generated by said comparing means whenever said two-state control means is in the second state and permitting said first quantity to assume a value indicative of the differential temperature when said two-state control means is in the first state; and accumulating means connected to said two-state control means for accumulating a second quantity whenever said two-state control means is in the second state, the accumulation of said second quantity representing said quantity of heat consumed.

2. The measuring device according to claim 1 wherein said accumulating means comprises counting means registering units representing the quantity of the magnitude used for return of the member of said first measuring means to the zero position.

3. The measuring device according to claim 1 wherein said comparing means comprises bridge means connected to said temperature sensing means and said first measuring means, said bridge means being in a state of balance at zero temperature differential and in a state of imbalance when a temperature differential is sensed; and wherein said nulling means comprise bridge control means connected to the bridge means for returning the same from a state of imbalance to the state of balance; said two-state control means including drive means, said drive means being drivingly coupled with said bridge control means for driving the same into a position in which the bridge means is in the state of balance.

4. The measuring device according to claim 3 wherein said bridge means comprises a 4-arm Wheatstone bridge, two arms of said bridge being connected to the temperature sensing means and the other two arms including impedance means, output terminals of the bridge being connected to the first measuring means for operating the same; and wherein said bridge control means comprise a potentiometer connected to the bridge and having a slider biased into a neutral position, said drive means being coupled to said slider for driving the same toward the position balancing the bridge.

5. The measuring device according to claim 3 wherein said two-state control means comprises switching means for closing or opening an energizing circuit for said drive means, said switching means being operated for closing said energizing circuit upon receiving of said second signal from said second measuring means, and said first measuring means includes photo-electric means comprising a photo-sensitive device and a source of light adjacent the zero temperature differential position of said member for generating said first signal for operating said switching means to open said energizing circuit.

6. The measuring device according to claim 5 wherein said drive means comprises a constant speed motor.

7. A measuring device for measuring the quantity of heat consumed by a medium circulating through a utilization loop of a heat exchange system having inlet and outlet conduits, said measuring device comprising in combination:

a first rotatably mounted Bourdon tube thermally connected to the inlet conduit of said heat exchange system;

a second rotatably mounted Bourdon tube thermally connected to the outlet conduit of said heat exchange system;

means for differentially connecting said Bourdon tubes to a first shaft so that the relative rotation of said first shaft indicates the differential temperature of the medium in said conduits;

first and second shutter plates coaxially aligned and mounted in superimposition, each shutter plate including an elongated slot;

means for connecting said first shutter plate to said first shaft so that said first shutter plate rotates and the angular position of rotation represents said differential temperature;

a rotatable second shaft connected to said second shutter plate to rotate said second shutter plate;

a light beam controlled signalling means whose light beam is cut off only when said shutter plates have a particular relative angular displacement to emit a first signal;

a home position biased drive means connected to said second shaft for rotating said second shutter plate;

first measuring means for measuring the volume of medium circulating in at least one of said conduits and emitting a second signal for each given quantum of volume;

a two-state control means connected to said drive means, said light beam controlled signalling means and said first measuring means, said two-state control means being switched to a first state upon receipt of a first signal from said light beam controlled signalling means and being switched to a second state upon receipt of a second signal from said first measuring means;

means connected to said two-state control means and said drive means for energizing said drive means to rotate said second shutter plate from a home position whenever said two-state control means is in said second state; and accumulating means connected to said two-state control means for accumulating a quantity whenever said two-state control means is in the second state, the accumulation of said quantity representing said quantity of heat consumed.

8. The measuring device according to claim 7 wherein said light beam controlled signalling means comprises a photo-electric means having a light source disposed adjacent to one side of the superimposed shutter plates and a photocell disposed adjacent to the other side of the shutter plates for control of the passage and the cut-off of the beam by the relative angular position of the shutter plates.

References Cited

UNITED STATES PATENTS

| | | | |
|---|---|---|---|
| 2,359,767 | 10/1964 | Keinath | 73—432 |
| 2,689,932 | 9/1954 | Hornfeck | 318—28 |
| 2,745,996 | 5/1956 | Sylvander | 318—29 |
| 3,301,049 | 1/1967 | Meyerson | 73—193 |

JAMES J. GILL, Primary Examiner

H. GOLDSTEIN, Assistant Examiner